United States Patent
Merchant et al.

(10) Patent No.: US 9,547,308 B2
(45) Date of Patent: Jan. 17, 2017

(54) SYSTEM AND METHOD FOR DYNAMICALLY POSITIONING A FLOATING VESSEL ALONGSIDE A TURRET MOORED FLOATING VESSEL

(71) Applicant: Keppel Offshore & Marine Technology Centre Pte. Ltd., Singapore (SG)

(72) Inventors: Aziz Merchant, Singapore (SG); Anis Hussain, Singapore (SG); Ankit Kumar Choudhary, Singapore (SG)

(73) Assignee: Keppel Offshore & Marine Technology Centre Pte. Ltd., Singapore (SG)

( * ) Notice: Subject to any disclaimer, the term of this patent is extended or adjusted under 35 U.S.C. 154(b) by 0 days.

(21) Appl. No.: 14/786,451

(22) PCT Filed: Apr. 25, 2014

(86) PCT No.: PCT/SG2014/000182
§ 371 (c)(1),
(2) Date: Oct. 22, 2015

(87) PCT Pub. No.: WO2014/175831
PCT Pub. Date: Oct. 30, 2014

(65) Prior Publication Data
US 2016/0147229 A1     May 26, 2016

(30) Foreign Application Priority Data

Apr. 25, 2013   (SG) ............................... 201303171-1

(51) Int. Cl.
   *G05D 1/02*            (2006.01)
   *B63B 35/00*          (2006.01)
   (Continued)

(52) U.S. Cl.
   CPC ............ *G05D 1/0208* (2013.01); *B63B 35/00* (2013.01); *B63B 35/44* (2013.01); *B63H 5/125* (2013.01);
   (Continued)

(58) Field of Classification Search
   CPC ....... G05D 1/0208; B63B 35/00; B63H 5/125; G08G 3/02
   See application file for complete search history.

(56) References Cited

U.S. PATENT DOCUMENTS

| | | | | |
|---|---|---|---|---|
| 4,281,615 A * | 8/1981 | Wilson | ..................... | A62C 3/10 |
| | | | | 114/265 |
| 7,985,108 B1 * | 7/2011 | Bekker | .................. | B63B 1/107 |
| | | | | 114/144 B |
| 2010/0070118 A1 * | 3/2010 | Yamada | .................. | B63B 21/00 |
| | | | | 701/21 |

FOREIGN PATENT DOCUMENTS

WO     2012080241 A1    6/2012

OTHER PUBLICATIONS

International Preliminary Report on Patentability for International Application PCT/SG2014/000182, Report Issued Feb. 27, 2015, Mailed Feb. 27, 2015, 4 Pgs.
(Continued)

*Primary Examiner* — Basil T Jos
(74) *Attorney, Agent, or Firm* — KPPB LLP

(57) ABSTRACT

A rapid transition floating vessel that is able to follow the yaw motions of a turret moored floating vessel is provided. The rapid transition floating vessel includes a system and processes for dynamically positioning the floating vessel alongside a turret moored floating vessel whereby the floating vessel remains at a safe distance while being connected to the turret moored floating vessel. This is achieved by the floating vessel following the yaw motions of the turret (Continued)

moored floating vessel as the turret moored floating vessel weathervanes about a center of the turret moorings.

8 Claims, 8 Drawing Sheets

(51) Int. Cl.
  *B63H 5/125*  (2006.01)
  *G08G 3/02*  (2006.01)
  *B63H 25/42*  (2006.01)
  *B63B 35/44*  (2006.01)
  *B63H 25/04*  (2006.01)
  *B63B 1/10*  (2006.01)

(52) U.S. Cl.
  CPC .............. *B63H 25/04* (2013.01); *B63H 25/42* (2013.01); *G08G 3/02* (2013.01); *B63B 1/107* (2013.01); *B63B 2035/448* (2013.01)

(56) References Cited

OTHER PUBLICATIONS

International Search Report and Written Opinion for International Application PCT/SG2014/000182, Report Completed Jun. 30, 2014, Mailed Jun. 30, 2014, 9 Pgs.

Hals, Tandem Loading and Drilling Operations Under Changing Environmental Conditions, Dynamic Positioning Conference 2004, Retrieved from http://dynamicpositioning.com/proceedings/dp2004/operations on Jun. 25, 2014.

Mattila et al., Semisubmersible Rig "The Reliable Solution with Minimal Thrust Losses", Dynamic Positioning Conference 2002, Retrieved from http://www.dynamic-QOsitioning.com/directory on Jun. 25, 2014.

Meahan et al., A Safer Ship to Ship DP Control Strategy, Dynamic Positioning Conference 2002, Retrieved from http://dynamicpositioning.com/proceedings/dp2002/control_ship_to_ship.pdf on Jun. 25, 2014.

Miyazaki et al., A General Approach for DP Weathervane Control, Dynamic Positioning Conference 2012, Retrieved from http://dynamicpositioning.com/proceedings/dp2012/design_control_miyazaki.pdf on Jun. 25, 2014.

Moen, Crew Boat Station Keeping Challenges and Solutions, Dynamic Positioning Conference 2004, Retrieved from http://www.dynamic-QOsitioning.com/directory on Jun. 25, 2014.

Stephens et al., Design and Commissioning of a New Thruster Assisted Mooring System (TAMS) for Global Producer III, Dynamic Positioning Conference 2007, Retrieved from http://dynamic-positioning.com/proceedings on Jun. 25, 2014.

Valk, Van Der et al., Mooring of LNG Carriers to a Weathervaning Floater—Side-by-Side or Stern-to-Bow, OTC 17154, Offshore Technology Conference 2005, Retrieved from http://ebook.lib.sjtu.edu.cn/otc-2005/pdfs/otc17154.pdf on Jun. 25, 2014.

\* cited by examiner

SYSTEM AND METHOD FOR DYNAMICALLY POSITIONING A FLOATING VESSEL ALONGSIDE A TURRET MOORED FLOATING VESSEL

CROSS REFERENCE TO RELATED APPLICATIONS

This application is a national stage of PCT Application No. PCT/SG2014/000182, filed Apr. 25, 2014, which application claims priority to Singaporean Application No. 201303171-1, filed Apr. 25, 2013, the disclosures of which are hereby incorporated by reference in their entireties.

FIELD OF THE INVENTION

The present invention relates to a rapid transition floating vessel that is able to follow the yaw motions of a turret moored floating vessel. More particularly, this invention relates to a system and method for dynamically positioning a floating vessel alongside a turret moored floating vessel whereby the floating vessel is able to remain connected to the turret moored floating vessel by following the yaw motions of the turret moored floating vessel as the turret moored floating vessel weathervanes about a centre of the turret moorings.

BACKGROUND OF THE INVENTION

Floating vessels such as floating production platforms have been widely used in oil and gas exploration/production as these mobile platforms may be moved easily from one site to another. There are more than 200 ageing floating platforms operating worldwide. These platforms are commonly deployed at offshore sites off Brazil, West Africa and Australasia. In the Brazil offshore market alone; there are a total of 29 floating platforms that are currently being deployed. Of these, more than 65% of these floating platforms employ turret mooring systems. Turret mooring systems allows a platform to freely weather vane around, adopting the direction of the least resistance against waves, wind and currents. For drilling operations, this is advantageous as the platform is able to automatically adopt a heading that provides the least resistance against the raging elements.

As these platforms age, maintenance and upgrading works need to be carried out on these platforms. Furthermore, platform operators are also constantly trying to extend the sea-life of the deployed platforms. This can be achieved by replacing worn out equipment and machinery with newer models or upgrading existing models thereby extending the lifespan of the platforms. The difficulty faced by the platform operators is that these maintenance and upgrading works must be carried out while the platforms are still out at sea, with minimal disruptions to the operations of these platforms. If the platforms were to be disconnected or taken offline for maintenance works, the loss of earnings cause by the down time of the platforms would be insurmountable.

A solution to the above issues is to use vessels equipped with the necessary machines and tools to carry out the necessary upgrading and maintenance works out at sea. However, most vessels are not able to withstand the rough seas and harsh environmental conditions in which floating platforms operate in. One type of floating vessel that is able to operate under such harsh and unpredictable operating conditions is a floating vessel designed for offshore work such as a semi-submersible.

The present market trend is to build semi-submersibles with displacements between 30,000 Metric Tonnes to 55,000 Metric Tonnes. Semi-submersibles are getting heavier and bigger in size as more semi-submersible operators are inclined to load the semi-submersibles with as many features as possible, such as accommodation units, emergency relief centres, helicopter landing pads, storage areas and such other space consuming activities. As the semi-submersibles become larger and heavier, more power is required to move these semi-submersibles. As such, the size of the power thrusters or the size of the engines increases as well. Due to the imbalance in weight and available power, semi-submersibles that are presently available are not able to react fast enough to the yaw motions of the turret moored platform as the platform weather vanes. This is because presently available semi-submersibles are either too heavy to react to the yaw motions or the thrust power of the semi-submersibles engines are fully utilized for station keeping, that is keeping the semi-submersible stationary in the harshest weather conditions. Therefore, it is a challenge to design a semi-submersible that is able to operate safely alongside a turret moored floating platform.

SUMMARY OF THE INVENTION

The above and other problems in the art are solved and an advance in the art is made in accordance with this invention. A first advantage of embodiments of systems and methods in accordance with this invention is that a floating vessel is able to dynamically maintain its position alongside a turret moored floating vessel even when the turret moored vessel weathervanes about the centre of its turret moorings. A second advantage of embodiments of systems and methods in accordance with this invention is that about 30% of the floating vessel's total power is allocated as residual thrust thereby providing the floating vessel with sufficient power to react to the yaw motions of the turret moored floating vessel. A third advantage of embodiments of systems and methods in accordance with this invention is that the floating vessel exhibits higher frequency of low frequency yaw motions without clashing with the turret moored floating vessel. This improves the uptime of the turret moored floating vessel from 50% to upwards of 85%.

The above advantages are provided by embodiments of a method or a computer system in accordance with the invention operating in the following manner. The system first determines the linear distance between a floating vessel and a turret moored floating vessel. The floating vessel is provided with a plurality of engines that include at least one main engine and at least one maneuvering engine. The system controls the output power of the maneuvering engine and then directs the output power of the maneuvering engine to a plurality of marine propellers provided in rotatable pods to ensure the determined linear distance matches a first distance. Further, the total output power of the maneuvering engine is between 20% and 35% of total power of the plurality of engines, and the floating vessel has a total output power of the plurality of engines over displacement of the floating vessel ratio between 0.80 and 1.10.

In accordance with embodiments of the invention, the total output power of the maneuvering engine for following a rotational displacement of the turret moored floating vessel is determined by the equation below:

$$T = (M+A) \cdot b \cdot \left(\frac{4 \cdot \pi}{T_P}\right)^2,$$

whereby T denotes a maximum total residual output power of the plurality of engine thrusters, M denotes a mass of the floating vessel in metric tonnes, A denotes an added mass of the floating vessel in a surge/sway direction in metric tonnes, b denotes a displacement of an axis of the turret moored floating vessel, and $T_P$ denotes a response time of the first vessel to move a distance b.

In accordance with embodiments of the invention, the system determines the displacement of the axis of the turret moored floating vessel by the equation below:

$$b = \left(\frac{2 \cdot a_\psi}{360}\right) \cdot 2 \cdot \pi \cdot c$$

whereby b denotes the displacement of the axis of the turret moored floating vessel, $a_\psi$ denotes a yaw amplitude of the turret moored floating vessel in degrees, and c denotes a linear distance along an axis of the turret moored floating vessel between a centre of a turret mooring of the turret moored floating vessel and the floating vessel.

In accordance with embodiments of the invention, the system determines a linear distance between the floating vessel and the turret moored floating vessel by receiving a yaw measurement of the turret moored floating vessel, obtaining a current position of the floating vessel; and calculating the linear distance between the floating vessel based on the received yaw measurement and obtained position.

In accordance with embodiments of the invention, a floating vessel for following yaw motions of a turret moored floating vessel by dynamically maintaining a distance between the floating vessel and the turret moored floating vessel is provided. The floating vessel comprises a plurality of engines having at least one main engine and at least one maneuvering engine wherein a total output power of the maneuvering engine is between 20% and 35% of total power of the plurality of engine and wherein the floating vessel has a total output power of the plurality of engines over displacement of the floating vessel ratio between 0.80 and 1.10. The floating vessel also includes a computer system for determining a linear distance between the floating vessel and the turret moored floating vessel. The computer system also controls output power of the maneuvering engine, and directs the output power of the maneuvering engine to a plurality of marine propellers that are provided in rotatable pods to ensure the determined linear distance matches a first distance.

In accordance with embodiments of the invention, the total output power of the floating vessel's maneuvering engine for following rotational displacement of the turret moored floating vessel is determined by below equation:

$$T = (M + A) \cdot b \cdot \left(\frac{4 \cdot \pi}{T_P}\right)^2,$$

where T denotes a maximum total output power of the maneuvering engines, M denotes a mass of the floating vessel in metric tonnes, A denotes an added mass of the floating vessel in a surge/sway direction in metric tonnes, b denotes a displacement of an axis of the turret moored floating vessel, $T_P$ denotes a response time of the first vessel to move a distance b. The displacement of the axis of the turret moored floating vessel may be determined by below equation:

$$b = \left(\frac{2 \cdot a_\psi}{360}\right) \cdot 2 \cdot \pi \cdot c,$$

where b denotes the displacement of the axis of the turret moored floating vessel, $a_\psi$ denotes a yaw amplitude of the turret moored floating vessel in degrees, c denotes a linear distance along an axis of the turret moored floating vessel between a centre of a turret mooring of the turret moored floating vessel and the floating vessel.

BRIEF DESCRIPTION OF THE DRAWINGS

The above advantages and features in accordance with this invention are described in the following description and are shown in the following drawings.

DETAILED DESCRIPTION OF THE INVENTION

The present invention relates to a rapid transition floating vessel that is able to follow the yaw motions of a turret moored floating vessel. The floating vessel which is provided alongside a turret moored floating vessel is able to remain connected to the turret moored floating vessel. The floating vessel achieves this by dynamically following the yaw motions of the turret moored floating vessel as the turret moored floating vessel weathervanes about a centre of the turret moorings.

Systems and methods in accordance with this invention provide that a floating vessel is able to dynamically maintain its position alongside a turret moored floating vessel even when the turret moored vessel weathervanes about the centre of its turret moorings. Furthermore, between 20% and 35% of the floating vessel's total power is allocated as residual thrust thereby providing the floating vessel with sufficient power to react to the yaw motions of the turret moored floating vessel. The floating vessel also exhibits higher frequency of low frequency yaw motions without clashing with the turret moored floating vessel therefore improving the uptime of the turret moored floating vessel from 50% to upwards of 85%.

Figure 1:
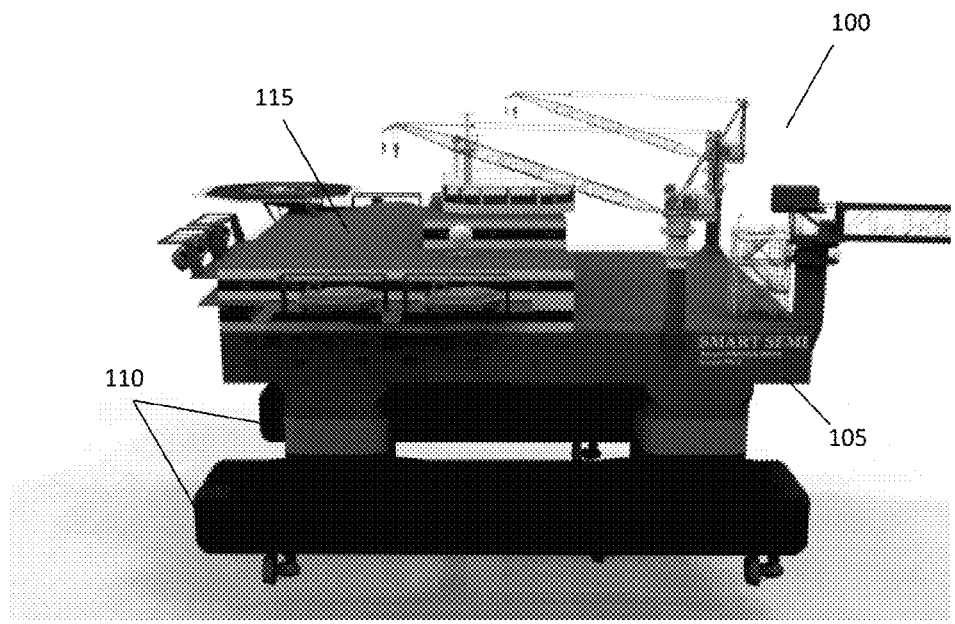
FIG. 1 illustrating a perspective view of a first vessel in accordance with embodiments of the invention.

A perspective view of a rapid transition floating vessel in accordance with an embodiment of this invention is illustrated in FIG. 1. An example of such a floating vessel is a semi-submersible or other such vessels that have good stability and sea-keeping characteristics. FIG. 1 illustrates such a floating vessel, which is semi-submersible 100 comprising a single deck box hull 105, pontoons 110 and top deck 115. Top deck 115 may have a helicopter landing pad, cranes, a gangway that may be used to connect semi-submersible 100 to a turret moored floating vessel and/or machinery for carrying out repairs or upgrading works.

Figure 2:
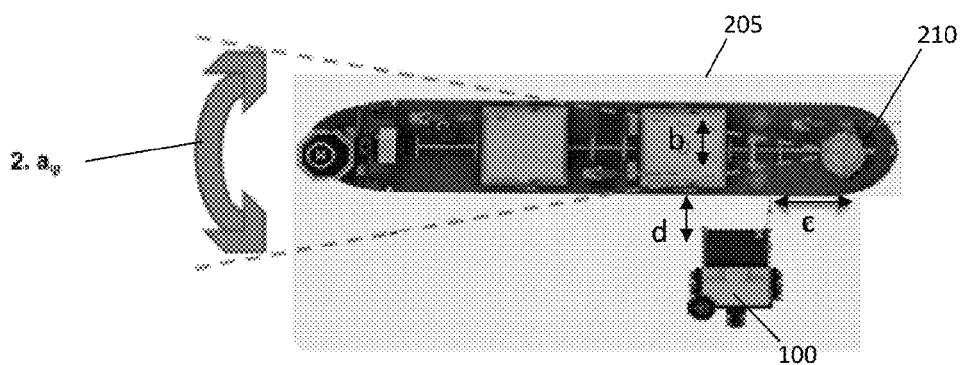
FIG. 2 illustrating a top view of a turret moored floating vessel with a floating vessel dynamically positioned alongside in accordance with embodiments of the invention.

FIG. 2 illustrates a top view of semi-submersible 100 operating alongside turret moored floating vessel 205. Semi-submersible 100 is provided with a plurality of engine thrusters which are used for station keeping operations and for following the rotational motions of turret moored floating vessel 205 as vessel 205 weathervanes about turret mooring 210. The plurality of engine thrusters may include, but are not limited to, main engines and/or maneuvering engines thrusters such as configurations of marine propellers that are placed in rotatable pods. The propellers in the maneuvering engines are able to rotate about various angles as required to rapidly change the directional heading of semi-submersible 100. These maneuvering engines are used to manoeuvre semi-submersible 100 rapidly and efficiently. However, most semi-submersibles known in the art typically allocate most of the power to the main engines rather than the maneuvering engines.

Semi-submersible 100 is also provided with a computer system that is configured to dynamically maintain semi-submersible 100 at a fixed distance "d" with regard to turret moored floating vessel 205. In other words, the computer system provided at semi-submersible 100 ensures that semi-submersible 100 remains at a safe distance or a fixed distance "d" from turret moored floating vessel 205. This ensures that these two vessels do not collide and also ensures that a gangway connecting these two vessels remains connected throughout as vessel 205 weathervanes about turret mooring 210. The computer system utilizes data obtained from global positioning sensors provided on both vessels together with data obtained from motion, wind and gyro sensors provided on both or either vessels. Information obtained from these sensors provides positional information and data about the environmental forces acting on vessels 100 and 205 to the computer system.

Figure 3:
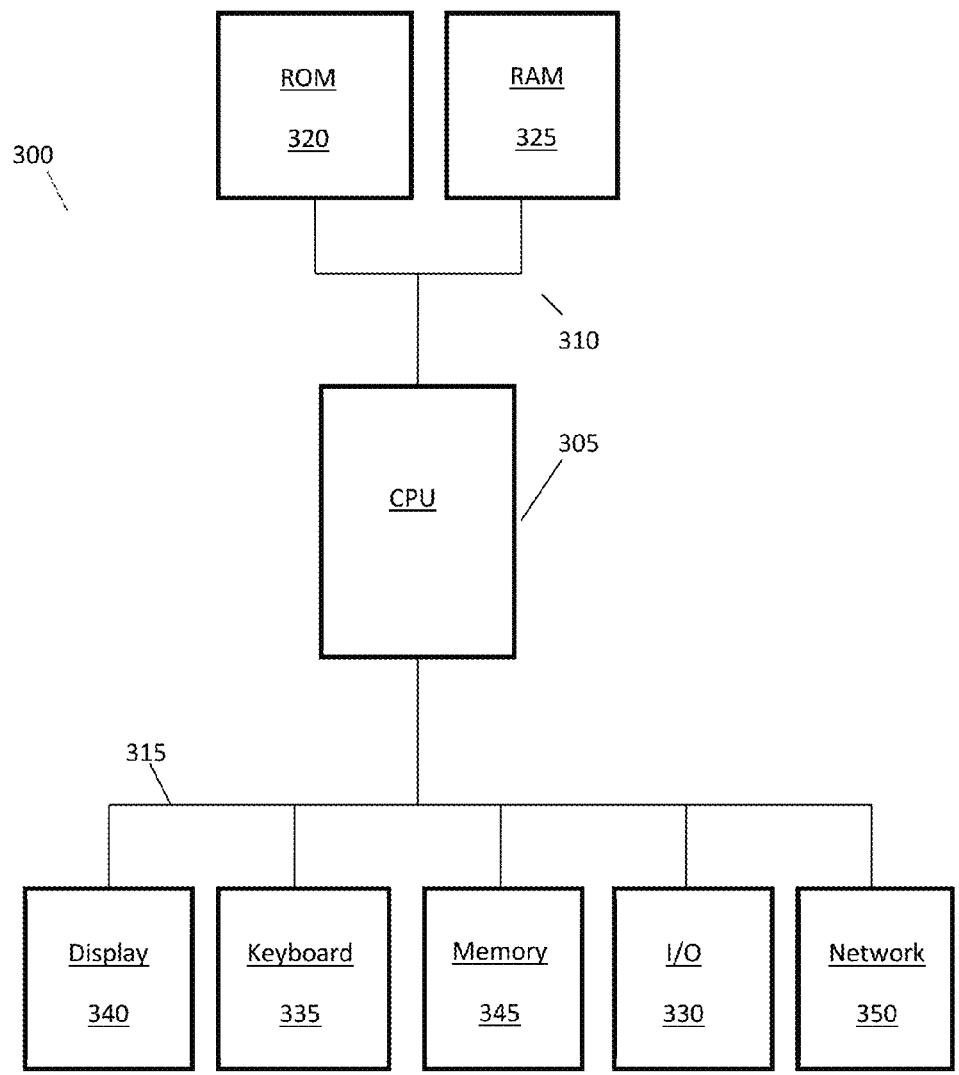
FIG. 3 illustrating a block diagram representative of processing systems providing embodiments in accordance with embodiments of the invention.

Processes provided by instructions stored by a media are executed by a processing system in a computer system or in a computer server. A computer system may be provided in one or more servers or computers to process data captured and recorded by the various components of a system in accordance with embodiments of the invention. The instructions may be stored as firmware, hardware, or software. FIG. 3 illustrates an example of such a processing system. Processing system 300 may be the processing system in the servers or computers that execute the instructions to perform the processes for providing a method and/or system in accordance with embodiments of this invention. One skilled in the art will recognize that the exact configuration of each processing system may be different and the exact configuration of the processing system in each device may vary and FIG. 3 is given by way of example only.

Processing system 300 includes Central Processing Unit (CPU) 305. CPU 305 is a processor, microprocessor, or any combination of processors and microprocessors that execute instructions to perform the processes in accordance with the present invention. CPU 305 connects to memory bus 310 and Input/Output (I/O) bus 315. Memory bus 310 connects CPU 305 to memories 320 and 325 to transmit data and instructions between memories 320, 325 and CPU 305. I/O bus 315 connects CPU 305 to peripheral devices to transmit data between CPU 305 and the peripheral devices. One skilled in the art will recognize that I/O bus 315 and memory bus 310 may be combined into one bus or subdivided into many other busses and the exact configuration is left to those skilled in the art.

A non-volatile memory 320, such as a Read Only Memory (ROM), is connected to memory bus 310. Non-volatile memory 320 stores instructions and data needed to operate various sub-systems of processing system 300 and to boot the system at start-up. One skilled in the art will recognize that any number of types of memory may be used to perform this function.

A volatile memory 325, such as Random Access Memory (RAM), is also connected to memory bus 310. Volatile memory 325 stores the instructions and data needed by CPU 305 to perform software instructions for processes such as the processes required for providing a system in accordance with embodiments of this invention. One skilled in the art will recognize that any number of types of memory may be used as volatile memory and the exact type used is left as a design choice to those skilled in the art. I/O device 330, keyboard 335, display 340, memory 345, network device 350 and any number of other peripheral devices connect to I/O bus 315 to exchange data with CPU 305 for use in applications being executed by CPU 305. I/O device 330 is any device that transmits and/or receives data from CPU 305. Keyboard 335 is a specific type of I/O that receives user input and transmits the input to CPU 305. Display 340 receives display data from CPU 305 and display images on a screen for a user to see. Memory 345 is a device that transmits and receives data to and from CPU 305 for storing data to a media. Network device 350 connects CPU 305 to a network for transmission of data to and from other processing systems.

With reference to FIG. 2, the computer system then calculates and controls the amount of power that is to be allocated to each of the plurality of engine thrusters. In particular, the computer controls the applied power, angle and direction of the maneuvering engine thrusters thereby ensuring that semi-submersible 100 remains at a distance "d" from turret moored floating vessel 205. For example, if the computer system determines that a distance between semi-submersible 100 and vessel 205 is less than distance "d", the computer system will supply power to the maneuvering engine thrusters on semi-submersible 100 to manoeuvre semi-submersible 100 away from vessel 205. Conversely, if the computer system determines that a distance between semi-submersible 100 and vessel 205 exceeds distance "d", the computer system will supply power to the maneuvering engine thrusters on semi-submersible 100 to manoeuvre semi-submersible 100 further closer to from vessel 205.

In embodiments of the invention, the linear distance between floating vessel 100 and turret moored floating vessel 205 may be obtained as follows. First, a computer system in vessel 100 will obtain the measured yaw rotation of turret moored floating vessel 205. This may be done by receiving the measured readings of a gyro sensor provided on turret moored floating vessel 205. The computer system in vessel 100 will then obtain the present or current position of floating vessel 100 in relation to turret moored floating vessel 205. This may be done by obtaining the readings from positional sensors provided on both vessels or by analysing global positioning satellite data. All this information is then combined in the computer system and analysed to determine the linear distance between floating vessel 100 and turret moored floating vessel 205. The computer system for performing the processes described above may be provided on floating vessel 100, as disclosed, or at turret moored floating vessel 205 or on both vessels. Furthermore, the computer system may be a computer system connected to an online database, a computer server or a cloud computing server network.

In order to ensure that the engine thrusters on semi-submersible 100 have sufficient power to follow the motions of vessel 205, the total output power of the maneuvering engine thrusters used for maneuvering semi-submersible 100 must be carefully designed. The following discloses a method for determining the total output power of these maneuvering engine thrusters. First, certain parameters of vessels 100 and 205 have to be defined.

The linear displacement of an axis of turret moored floating vessel 205 as vessel 205 weathervanes is defined as "b" (see FIG. 2). Further, a linear distance along the axis of turret moored floating vessel 205 between a centre of turret mooring 210 and vessel 100 is defined as "c" (see FIG. 2). In other words, the length of the track that vessel 100 has to manoeuvre to follow the rotational motions of turret moored floating vessel 205 is "b" while the distance between semi-submersible 100 and the centre of the turret mooring system on vessel 205 is "c". In embodiments of the invention, the turret mooring system is provided at a first end of turret mooring floating vessel 205. Therefore, as turret moored floating vessel 205 weathervanes, the other end of vessel 205 will move across an angle $2 \cdot a_\psi$ as shown in FIG. 2.

Based on FIG. 2, in order for semi-submersible 100 and turret moored floating vessel 205 to respond in tandem without lagging or colliding, the linear distance semi-submersible 100 has to correct for is given by the following formula:

$$b = \frac{2 \cdot a_\varphi}{360} \cdot 2 \cdot \pi \cdot c$$

whereby:
b=length of the track for semi-submersible 100 to follow turret moored floating vessel 205;
$a_\psi$=the yaw amplitude of turret moored floating vessel 205 in degrees; and
c=distance between semi-submersible 100 and a centre turret mooring 210.

In accordance with an embodiment of the invention, the optimized distance of "c" is chosen to be around ⅔ of the turret moored floating vessel length in order to keep the semi-submersible away from the operating area of the turret mooring system. The distance is also optimized such that the semi-submersible is not too far away from the turret in order to maximize the following ability of the semi-submersible. In accordance with other embodiments of the invention, "b" may be selected to be around 10 m, "$a_\psi$" may be selected to be around 5 degrees and "c" may be selected to be around 30 m.

A dynamic positioning stiffness or DP stiffness term P is given by the following formula:

$$P = \frac{T}{b}$$

whereby:
T=total thrust made available to semi-submersible 100 for following the yaw motions of turret moored floating vessel 205; and
b=length of the track that semi-submersible 100 has to follow turret moored floating vessel 205.

In accordance with embodiments of the invention, the total power allocated to the maneuvering thruster engines provided on semi-submersible 100 for following the yaw motions of turret moored floating vessel may be between 20% to 35% of the total engine thruster power made available to semi-submersible 100. For example, if the semi-submersible has a total combined thruster power of 3,468 kN (i.e. main engine and maneuvering engines), T would then be equal to about 1,040 kN. In embodiments of the invention, the dynamic positioning stiffness should be about 100 kN/m under the assumption that the maximum $\alpha_\varphi$ is about 10 degrees and c is about 30 m which results in b being 10 m.

TABLE 1

| Total combined thruster power (kilo Newton) | Thruster power available for following turret moored floating vessel, T (kilo Newton) | T/Total combined thruster power |
| --- | --- | --- |
| 3,468 | 1,387 | 40% |
| 3,468 | 1,214 | 35% |
| 3,468 | 1,040 | 30% |
| 3,468 | 867 | 25% |
| 3,468 | 693 | 20% |
| 3,468 | 520 | 15% |
| 3,468 | 347 | 10% |

Table 1 above shows a range of power allocated to semi-submersible 100 for following the rotational motions of turret moored floating vessel 205 as the power ratio (e.g. T/Total combined thruster power) varies. Of notable mention is that the total combined thruster power remains unchanged throughout. This means that the size of the engines do not change and the power ratio varies.

The response time, $T_p$, of semi-submersible 100 for following the yaw motions of turret moored floating vessel 205 is given by the following formula:

$$T_p = 2 \cdot 2 \cdot \pi \cdot \sqrt{\frac{M+A}{P}}$$

whereby:
M=mass of semi-submersible 100 in Metric Tonne; and
A=added mass of semi-submersible 100 in a surge direction in Metric Tonne.

Based on the equations disclosed above, the following ability of the semi-submersible, $ä_\psi$, may be summarized and be determined based on the following formula:

$$\ddot{a}_\varphi = \frac{T}{M+A} \times \frac{360}{4\pi c}$$

whereby:

$$\ddot{a}_\varphi = a_\varphi \cdot \frac{(4\pi)^2}{T_P^2}$$

whereby:

T=total thrust made available to semi-submersible 100 for following the yaw motions of turret moored floating vessel 205;

M=mass of semi-submersible 100 in Metric Tonne;

A=added mass of semi-submersible 100 in the surge/sway direction in Metric Tonne;

c=distance between semi-submersible 100 and the centre of the turret mooring system; and $T_p$=response time of semi-submersible 100

The double derivative of the turret moored floating vessel's yaw motion will give the acceleration required by the semi-submersible to follow the yaw motion of the turret mooring floating vessel so that the turret moored floating vessel and the semi-submersible may remain connected through a gateway during the upgrading and maintenance works as the rapid transition semi-submersible operates alongside the turret moored platform.

The semi-submersible's acceleration to respond with the yaw motions of the turret moored platform is directly proportional to the vessel bollard pull or thrust available and inversely proportional to the vessel mass and added mass in the surge direction. Therefore, in order for the semi-submersible to increase its following ability, the mass or displacement of the semi-submersible has to be reduced while the power made available to the semi-submersible should be increased accordingly. In short, for better following ability, the size of the semi-submersible has to be reduced and the power produced by the thrusters has to increase.

The above equations may be rearranged to obtain the maximum total output power that has to be allocated to the maneuvering engine thrusters to ensure that these two vessels remain connected and do not collide. In other words, the amount of power the maneuvering engine thrusters must have so that semi-submersible 100 is able to follow the rotational displacement of the turret moored floating vessel is determined by the equation below.

$$T = (M+A) \cdot b \cdot \left(\frac{4 \cdot \pi}{T_P}\right)^2,$$

In the equation above, T denotes a maximum total output power allocated to the maneuvering engine thrusters, M denotes a mass of the floating vessel in metric tonnes, A denotes an added mass of the floating vessel in a surge/sway direction depending on the direction in which floating vessel 100 is connected to the turret moored floating vessel 205 in metric tonnes, b denotes a displacement of an axis of the turret moored floating vessel, $T_P$ denotes a response time of the first vessel to move a distance b.

In accordance with embodiments of the invention, in order to improve the following ability of the semi-submersible, the rapid transition semi-submersible has to have a large bollard pull, a small displacement, an optimized hull shape to reduce the surge added mass, carefully selected hull shape and size to minimize the thrust required for self-station keeping and to maximize the thrust available for the semi-submersible's following ability and the orientation of the semi-submersible has to be carefully aligned. The added mass of the semi-submersible is reduced in a surge/sway direction by providing a small as possible projected area without compromising the stability of the vessel. Further, by rounding the corners of the pontoon and columns, this also reduces the added mass of the vessel. The pontoon height is also minimized to minimize added mass and also to accommodate the foundation of a thruster located beneath it.

Figure 4:
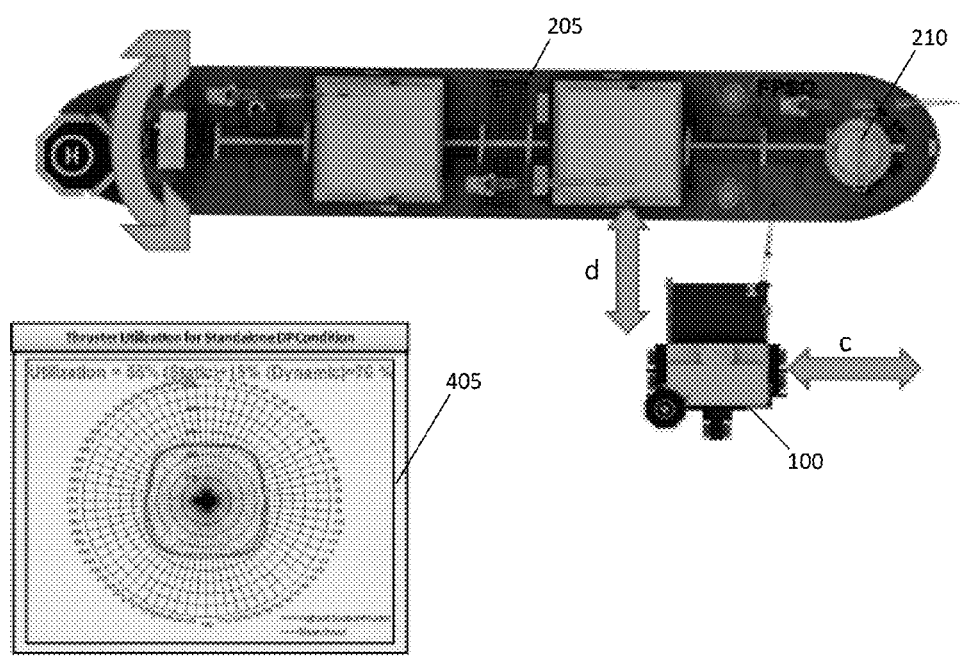
FIG. 4 illustrating a top view of a turret moored floating vessel with a floating vessel dynamically positioned alongside and a graph showing the power utilization of the dynamically positioned floating vessel in accordance with embodiments of the invention.

As an example, when the rapid transition semi-submersible operates in a typical offshore environment off Brazil, it was found that when 70% of total thrust power was allocated for the self-station keeping, the semi-submersible was able to remain stationary. That is with 70% of the total thrust power allocated for station keeping, the semi-submersible is able to withstand the harsh environmental conditions and able to operate normally. This means that the remaining 30% of the total thrust power may be allocated to the maneuvering engines of the semi-submersible for following the yaw motions of the turret moored floating vessel. This power utilization chart 405 is illustrated in FIG. 4.

In embodiments of the invention, the operability target was to achieve between 80%-70% of the total power being utilized for station keeping. As a result, it is calculated that the optimized reserved allocated thrust for following yaw motion occurs when between 20% and 30% of total thrust power is allocated for this operation. The power producible by each the thrusters could be increased greatly in order to allocate more power for station keeping and for following the yaw motions however, this is detrimental to the vessel as this means that the overall size of the engines will have to be increased as well. In order to accommodate this increase in the size of the engines, this requires that more space be allocated on floating vessel 100. The buoyancy and space available on vessel 100 would have to be increased and as a result, this causes the vessel size, displacement and also added mass to increase. Therefore, this invention provides a method and system for achieving an optimized value of displacement and residual thrust power of a floating vessel or a semi-submersible.

In order to meet the key design parameters of semi-submersible 100 as mentioned above, the added mass in the surge direction of semi-submersible 100 has to be reduced. This may be achieved by optimizing the sizes and shapes of the pontoons and columns. By doing so, this reduces the added mass in the surge direction and also results in the semi-submersible having a better heave motion. In embodiments of the invention, this is achieved by designing the pontoons and columns to be slender in the surge direction thereby minimizing the added mass in the surge direction. Another method to reduce the added mass in the surge direction involves reducing the depths of the pontoons and by minimizing the water plane area of the columns. The stability of the semi-submersible may be improved by increasing the spacing between the pontoons without adversely affecting the added mass in the surge direction. Furthermore, in order to reduce the overall displacement of the semi-submersible, a single deck box is utilized. A superior connection of the bracings at the pontoon level may be used as well in order to improve the structural integrity of the semi-submersible. Higher agility or a faster response time may also be achieved by using a semi-submersible with a smaller displacement between 15,000 Metric Tonnes to 18,000 Metric Tonnes. For such a semi-submersible, the semi-submersible may be outfitted with power thrusters designed for producing 1 MW per 1000 MT of displacement/mass. This results in an efficient utilization of power to displacement ratio of 0.8 to 1.1 kW/MT.

Figure 5:
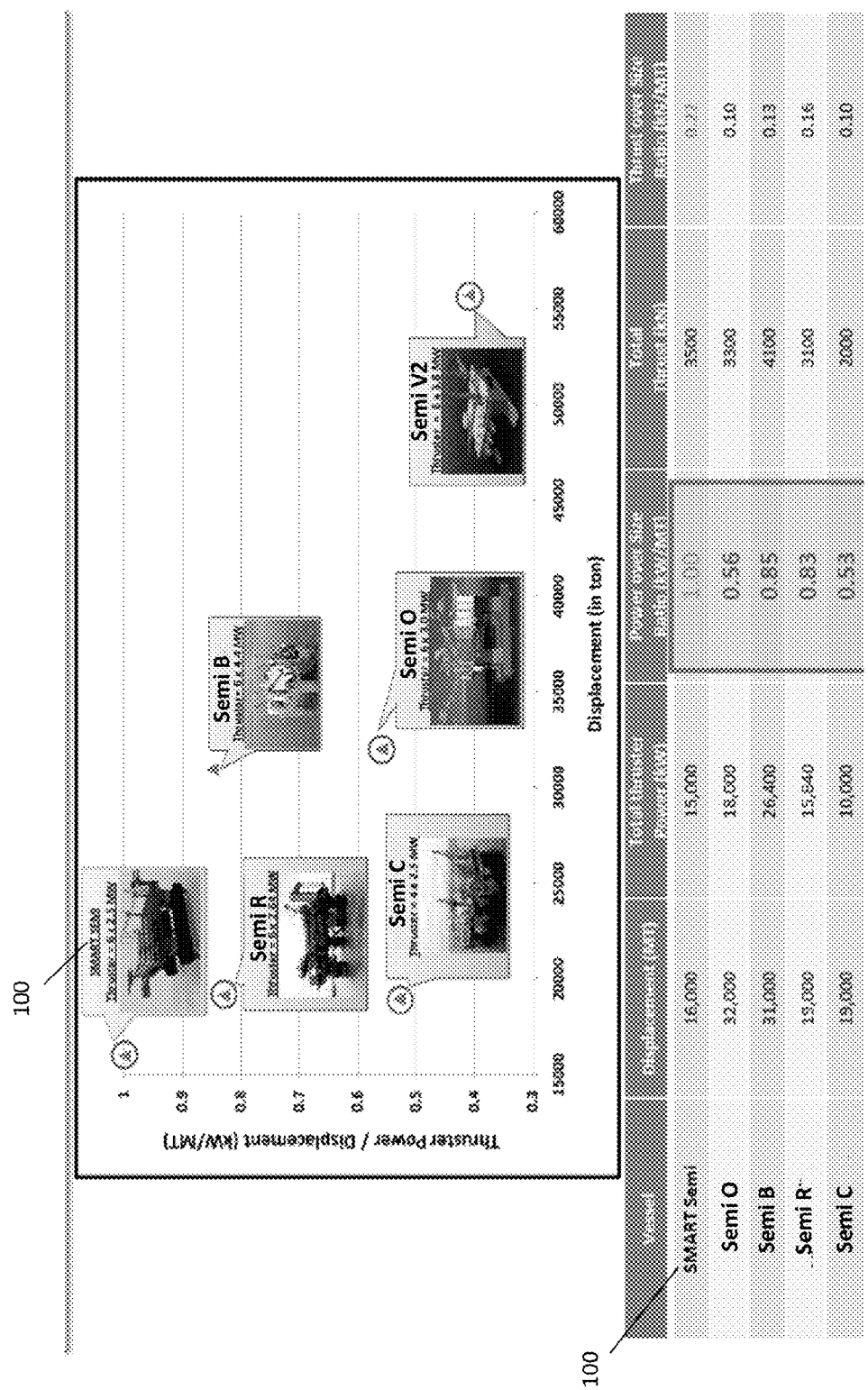
FIG. 5 illustrating power over size ratios and residual thrust over size ratios of floating vessels known to persons skilled in the art as compared to a floating vessel in accordance with embodiments of the invention.

FIG. 5 illustrates a comparison of the total power of the engines over the displacement size of the vessel ratios and thrust over size ratios for a number of existing semi-submersibles including semi-submersible 100. It can be seen that unlike the other existing semi-submersibles, semi-submersible 100 which was designed using the equations disclosed above, is able to achieve "a total power of the engines"/"the displacement size of the vessel" ratio of 1 and a thrust over size ratio of 0.22. In embodiments of the invention, "total power of the engines" over "the displacement size of the vessel" ratios may be between 0.8-1.1. When the "total power of the engines" over "the displacement size of the vessel" ratios is within this range, the floating vessel or semi-submersible 100 is able to maintain station keeping operations and dynamic positioning operations at optimum levels.

When the "total power of the engines"/"displacement size of the vessel" ratio drops below 0.8, this means that the size and weight of the vessel has increased as such, the vessel will require more power for station keeping and dynamic positioning operations. To achieve more power, the size of the engines would have to be increased and this turn would require an increase in the size, weight and displacement of the vessel making the increase in engine power meaningless. Similarly, if the "total power of the engines"/"the displacement size of the vessel" ratio increases beyond 1.1, this means that the power generated by the engines would have to increase greatly, which in turn increases the size of the engines as well. Again, this increase in the engine sizes would result in an increase in the size, weight and displacement of the vessel making the increase in engine power meaningless. Therefore, the optimum range for the "total power of the engines"/"the displacement size of the vessel" ratio is between 0.8 and 1.10.

Figure 6:
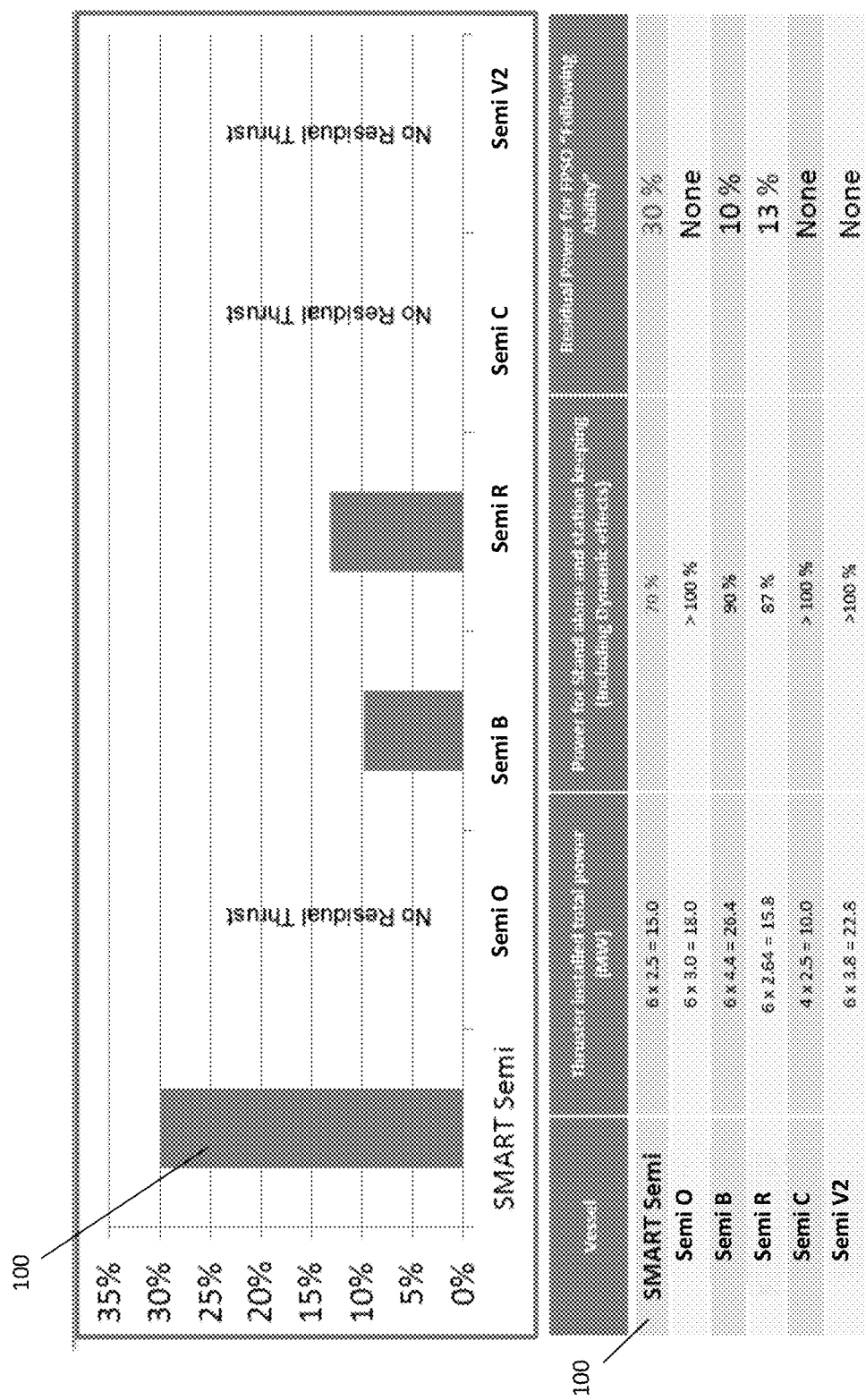
FIG. 6 illustrating residual thrust power of floating vessels known to persons skilled in the art as compared to a floating vessel in accordance with embodiments of the invention.

FIG. 6 illustrates the residual power for a number of existing semi-submersibles. Semi-submersible 100 which was designed based on the methods disclosed above has the highest allocated residual power for powering the maneuvering engines thrusters amongst these existing semi-submersibles. The semi-submersible with the closest residual power would be "Semi R". Even though "Semi R" has higher total power, due to the design of this vessel, most of the power has to be allocated for self-station keeping, resulting in a reduction of power available for following the yaw motions of a turret moored floating vessel.

Figure 7:
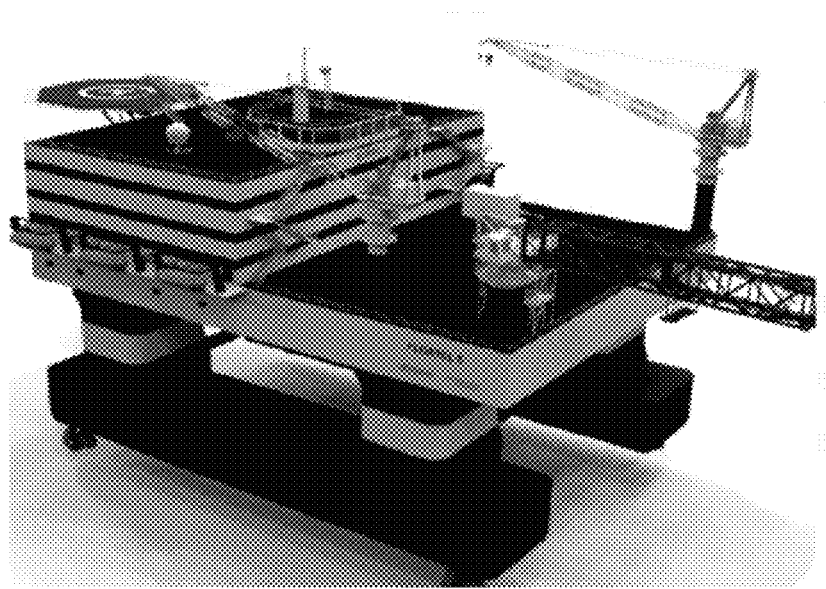
FIG. 7 illustrating a front perspective view of a floating vessel in accordance with embodiments of the present invention.
Figure 8:
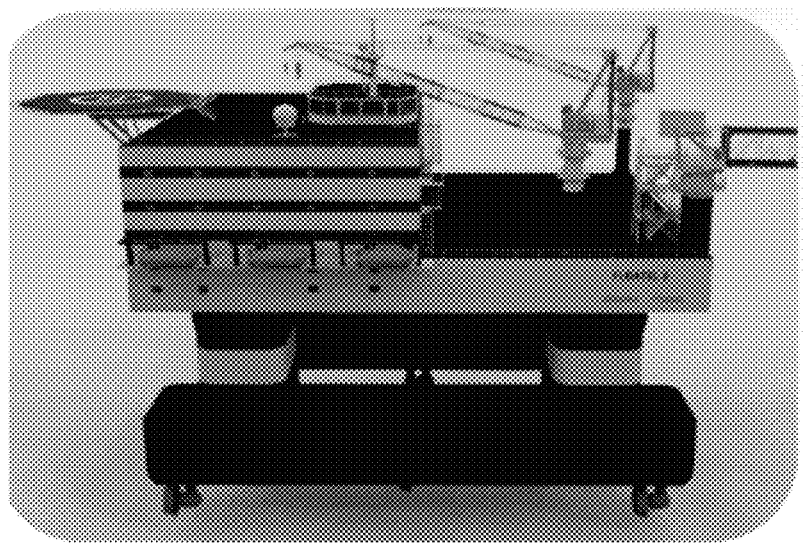
FIG. 8 illustrating a side view of a floating vessel in accordance with embodiments of the present invention.

FIG. 7 illustrates perspective views of a rapid transition semi-submersible that has been designed in accordance with this invention. One skilled in the art will recognize that various types of machinery or equipment may be provided on the top deck of the semi-submersible without departing from this invention.

In another embodiment of the invention, the equations disclosed above may be rearranged and the amplitude of the yaw of the turret moored floating vessel may be provided by the following formula:

$$a_\varphi = \left(\frac{T_p}{4\pi}\right)^2 \cdot \left(\frac{T}{M+A}\right) \cdot \left(\frac{360}{4\pi c}\right)$$

whereby:
T=total thrust made available to the rapid transition semi-submersible for following the yaw motions of the turret moored floating vessel;
M=mass of the semi-submersible in MT;
A=added mass of the semi-submersible in the surge direction in MT;
c=distance between the semi-submersible and the centre of the turret; and
$T_P$=response time of the rapid transition semi-submersible Under typical offshore operating conditions, a turret moored floating vessel will be subject to various environmental effects such as squalls, solutions, tidal effects, loops currents and wave groups. One skilled in the art will recognize that there may be other types of environmental effects other than those listed above. These effects were chosen as these effects are the ones that are commonly experienced by floating vessels at offshore sites.

Figure 9:
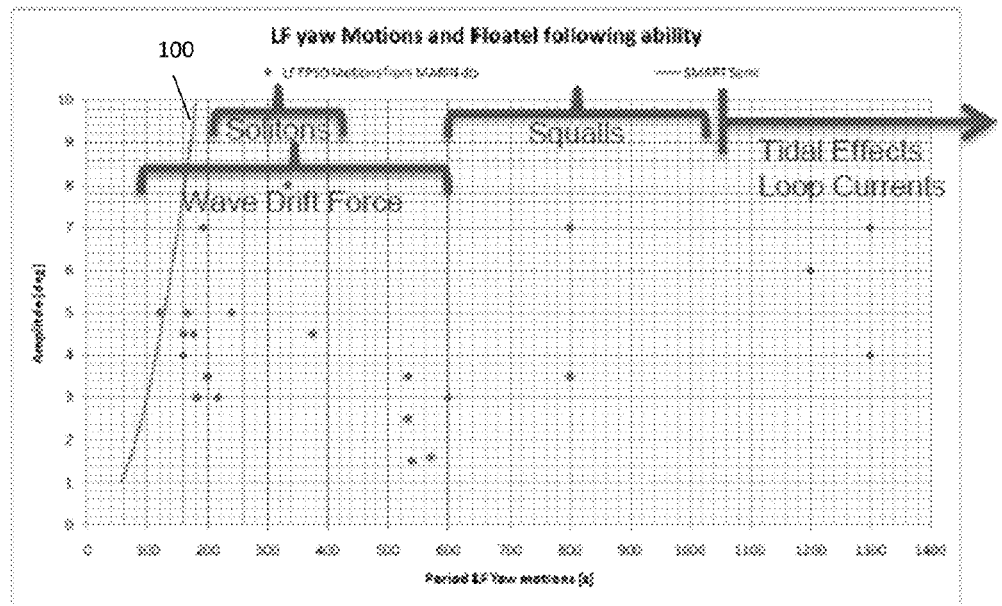
FIG. 9 illustrating yaw amplitudes and response times of floating vessels known to persons skilled in the art as compared to a floating vessel in accordance with embodiments of the invention.

FIG. 9 illustrates the ranges of the building uptimes of these various environmental effects. As illustrated in FIG. 9, it can be seen that squalls caused by changes in the direction of the wind may have a building uptime between 600 seconds to 1020 seconds. Changes in the direction of current may cause solutions, tidal effects or loop currents to occur. These effects have building uptime around 300 seconds, 7200 seconds and 86400 seconds respectively. This means that a semi-submersible that is connected to a turret moored floating vessel will have to respond to these changes within the time ranges specified in order to avoid clashing with the turret moored floating vessel as the moored vessel weather vanes under these effects. The amplitude response of a rapid transition semi-submersible in accordance with an embodiment of this invention is plotted against the periodic low frequency yaw motions in FIG. 9. This plot shows that the semi-submersible is able to follow the heading changes of the turret moored floating vessel in most of the cases. Furthermore, FIG. 9 also illustrates the dynamic positioning response of the semi-submersible in response to the yaw motion (in degrees) of the turret moored platform. Additionally, as the semi-submersible has automatic and manual positioning and heading control for specified maximum environmental conditions, during and following any single fault including loss of a compartment due to fire or flood, the semi-submersible may be classified under the equipment class DP-3. The semi-submersible may also have an additional computer system with a separate backup system to control the power allocated to the station keeping engines, i.e. the main engines or the maneuvering engines.

Figure 10:
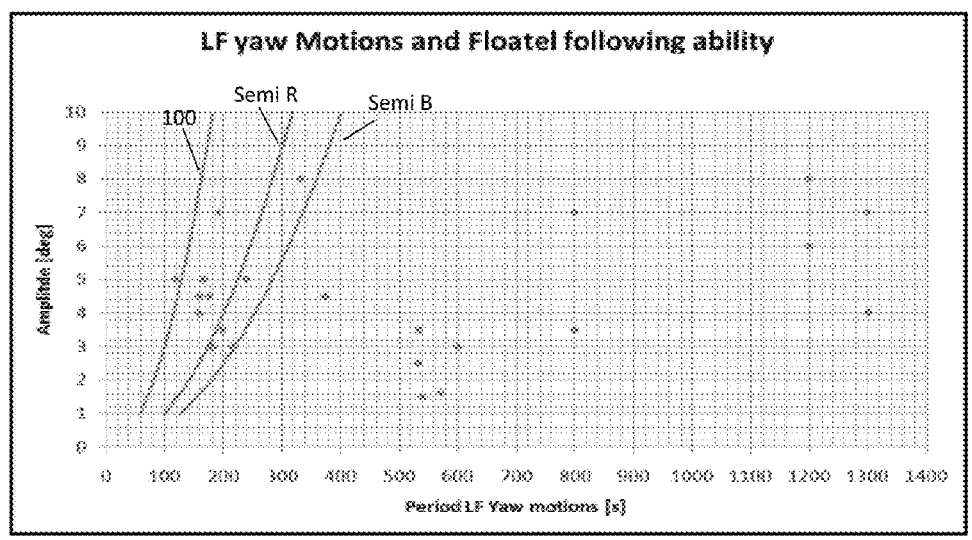
FIG. 10 illustrating a graph showing the amplitude versus the yaw motions of floating vessels known to persons skilled in the art as compared to a floating vessel in accordance with embodiments of the invention.

FIG. 10 illustrates a graph showing the following ability of rapid transition semi-submersible 100 in comparison to other semi-submersibles, i.e. Semis R and B. Based on this graph, it can be seen that rapid transition semi-submersible 100 is able to respond to the yaw motions of the turret moored floating vessel faster than the other existing semi-submersibles as sufficient power has been allocated to the maneuvering engines.

TABLE 2

| | |
|---|---|
| Pontoon (L × B × H) | 63.4 m × 12.5 m × 7.62 m |
| Column (L × B × H) | 10.0 m × 12.5 m × 12.8 m |
| Deckbox (L × B) | 63.4 m × 50 m |
| Box Bottom Height | 20.4 m |
| Main Deck Height | 21.9 m |
| Upper Deck Height | 26.2 m |
| Operational Draft | 12.2 m |
| Disp @ Operational draft | 16,000 mt |

Table 2 above sets out exemplary dimensions of a rapid transition semi-submersible in accordance with embodiments of the invention. One skilled in the art will recognize that these dimensions may be varied without departing from this invention as long as the key ratios are maintained. The key features to note are that the semi-submersible in this embodiment has maneuvering engine thrusters that generate 15 MW of power, main engines for station keeping that generate 21 MW of power, an accommodation unit that is able to accommodate 300 personnel (convertible to accommodate 600 personnel in times of need), workshop facilities for construction support, a deck area around 500 m$^2$ to 1500 m$^2$, a payload of around 3000 metric tonnes, an offshore crane support, a main crane of 25 MT, an auxiliary crane of 15 MT and a telescopic gangway of 38 m having +/−7.5 m of telescopic action. In addition to the above, the rapid transition semi-submersible is able to achieve lighter ship weight of around 15,000 to 18,000 MT.

The above is a description of a rapid transition semi-submersible that is able to respond rapidly to the yaw motions of a turret moored floating vessel as the moored vessel weathervanes. It is foreseen that those skilled in the art can and will design alternative embodiments of this invention.

The invention claimed is:

1. A method for dynamically maintaining a distance between a floating vessel and a turret moored floating vessel using a computing system, wherein the floating vessel includes a plurality of engines comprising at least one main engine and at least one maneuvering engine, the method comprising:
   determining a linear distance between the floating vessel and the turret moored floating vessel;
   controlling output power of the maneuvering engine; and
   directing the output power of the maneuvering engine to a plurality of marine propellers that are provided in rotatable pods to ensure the determined linear distance matches a first distance, wherein a total output power of the maneuvering engine is set to be between 20% and 35% of total power of the plurality of engines, and wherein the floating vessel is designed to have a total output power of the plurality of engines over displacement of the floating vessel ratio between 0.80 and 1.10, and wherein the total output power of the maneuvering engine for following rotational displacement of the turret moored floating vessel is determined by the below equation:

$$T = (M + A) \cdot b \cdot \left(\frac{4 \cdot \pi}{T_P}\right)^2,$$

where T denotes a maximum total output power of the maneuvering engines, M denotes a mass of the floating vessel in metric tons, A denotes an added mass of the floating vessel in a surge direction in metric tons, b denotes a displacement of an axis of the turret moored floating vessel, $T_P$ denotes a response time of the first vessel to move a distance b.

2. The method of claim 1 wherein the displacement of the axis of the turret moored floating vessel is determined by below equation:

$$b = \left(\frac{2 \cdot a_\psi}{360}\right) \cdot 2 \cdot \pi \cdot c$$

where b denotes the displacement of the axis of the turret moored floating vessel, $a_\psi$ denotes a yaw amplitude of the turret moored floating vessel in degrees, c denotes a linear distance along an axis of the turret moored floating vessel between a center of a turret mooring of the turret moored floating vessel and the floating vessel.

3. The method of claim 1 wherein the step of determining a linear distance between the floating vessel and the turret moored floating vessel comprises:
   receiving a yaw measurement of the turret moored floating vessel;
   obtaining a current position of the floating vessel; and
   calculating the linear distance between the floating vessel based on the received yaw measurement and obtained position.

4. A system for dynamically maintaining a distance between a floating vessel and a turret moored floating vessel, wherein the floating vessel includes a plurality of engines comprising at least one main engine and at least one maneuvering engine, the system comprising:
   circuitry in a server configured to determine a linear distance between the floating vessel and the turret moored floating vessel;
   circuitry in a server configured to control output power of the maneuvering engine; and
   circuitry in a sever configured to direct the output power of the maneuvering engine to a plurality of marine propellers that are provided in rotatable pods to ensure the determined linear distance matches a first distance, wherein a total output power of the maneuvering engine is between 20% and 35% of total power of the plurality of engines, and wherein the floating vessel has a total output power of the plurality of engines over displacement of the floating vessel ratio between 0.80 and 1.10, and wherein the total output power of the maneuvering engine for following rotational displacement of the turret moored floating vessel is determined by the below equation:

$$T = (M + A) \cdot b \cdot \left(\frac{4 \cdot \pi}{T_P}\right)^2,$$

where T denotes a maximum total output power of the maneuvering engines, M denotes a mass of the floating vessel in metric tons, A denotes an added mass of the floating vessel in a surge direction in metric tons, b denotes a displacement of an axis of the turret moored floating vessel, $T_P$ denotes a response time of the first vessel to move a distance b.

5. The system of claim 4 wherein the displacement of the axis of the turret moored floating vessel is determined by below equation:

$$b = \left(\frac{2 \cdot a_\psi}{360}\right) \cdot 2 \cdot \pi \cdot c,$$

where b denotes the displacement of the axis of the turret moored floating vessel, $a_\psi$ denotes a yaw amplitude of the turret moored floating vessel in degrees, c denotes a linear distance along an axis of the turret moored floating vessel between a center of a turret mooring of the turret moored floating vessel and the floating vessel.

6. The system of claim 4 wherein the circuitry configured to determine the linear distance between the floating vessel and the turret moored floating vessel comprises:
   circuitry in a server configured to receive a yaw measurement of the turret moored floating vessel;
   circuitry in a server configured to obtain a current position of the floating vessel; and
   circuitry in a server configured to calculate the linear distance between the floating vessel based on the received yaw measurement and obtained position.

7. A floating vessel for following yaw motions of a turret moored floating vessel by dynamically maintaining a distance between the floating vessel and the turret moored floating vessel, the floating vessel comprising:
   a plurality of engines, the plurality of engines comprising at least one main engine and at least one maneuvering engine wherein a total output power of the maneuvering engine is between 20% and 35% of total power of the plurality of engine and wherein the floating vessel is designed to have a total output power of the plurality of engines over displacement of the floating vessel ratio between 0.80 and 1.10, and wherein the total output power of the maneuvering engine for following rotational displacement of the turret moored floating vessel is determined by the below equation:

$$T = (M+A) \cdot b \cdot \left(\frac{4 \cdot \pi}{T_P}\right)^2,$$

where T denotes a maximum total output power of the maneuvering engines, M denotes a mass of the floating vessel in metric tons, A denotes an added mass of the floating vessel in a surge direction in metric tons, b denotes a displacement of an axis of the turret moored floating vessel $T_P$ denotes a response time of the first vessel to move a distance b; and
   a computer system for determining a linear distance between the floating vessel and the turret moored floating vessel, for controlling output power of the maneuvering engine, and for directing the output power of the maneuvering engine to a plurality of marine propellers that are provided in rotatable pods to ensure the determined linear distance matches a first distance.

8. The floating vessel of claim 7 wherein the displacement of the axis of the turret moored floating vessel is determined by below equation:

$$b = \left(\frac{2 \cdot a_\psi}{360}\right) \cdot 2 \cdot \pi \cdot c,$$

where b denotes the displacement of the axis of the turret moored floating vessel, $a_\psi$ denotes a yaw amplitude of the turret moored floating vessel in degrees, c denotes a linear distance along an axis of the turret moored floating vessel between a center of a turret mooring of the turret moored floating vessel and the floating vessel.

* * * * *